United States Patent
Edwards et al.

(10) Patent No.: US 6,298,394 B1
(45) Date of Patent: Oct. 2, 2001

(54) SYSTEM AND METHOD FOR CAPTURING INFORMATION ON AN INTERCONNECT IN AN INTEGRATED CIRCUIT

(75) Inventors: David A. Edwards, Clifton; Andrew M. Jones, Redland, both of (GB); Anthony W. Rich, Christchurch (NZ)

(73) Assignee: STMicroelectronics, Ltd. (GB)

( * ) Notice: Subject to any disclaimer, the term of this patent is extended or adjusted under 35 U.S.C. 154(b) by 0 days.

(21) Appl. No.: 09/411,617

(22) Filed: Oct. 1, 1999

(51) Int. Cl.$^7$ .................................................. G06F 3/00
(52) U.S. Cl. ........................... 710/15; 710/16; 710/126; 710/240
(58) Field of Search .......................... 710/15, 9, 16, 710/28, 36, 37, 39, 45, 48, 52, 55, 56, 57, 126, 129, 240

(56) References Cited

U.S. PATENT DOCUMENTS

| | | | |
|---|---|---|---|
| 4,503,495 | * 3/1985 | Boudreau . | |
| 4,607,348 | * 8/1986 | Sheth . | |
| 4,803,614 | * 2/1989 | Banba et al. | 707/10 |
| 4,814,981 | 3/1989 | Rubinfeld | 364/200 |
| 4,965,793 | * 10/1990 | Polzin et al. | 370/94.1 |
| 5,251,311 | 10/1993 | Kasai | 395/425 |
| 5,386,565 | 1/1995 | Tanaka et al. | 395/700 |
| 5,423,050 | 6/1995 | Taylor et al. | 395/575 |
| 5,434,804 | 7/1995 | Bock et al. | 364/579 |
| 5,440,705 | 8/1995 | Wang et al. | 395/421.1 |
| 5,448,576 | 9/1995 | Russell | 371/22.3 |
| 5,452,432 | 9/1995 | Macachor | 395/425 |
| 5,455,936 | 10/1995 | Maemura | 395/183.11 |
| 5,479,652 | 12/1995 | Dreyer et al. | 395/183.06 |
| 5,483,518 | 1/1996 | Whetsel | 370/13 |
| 5,488,688 | 1/1996 | Gonzales et al. | 395/183.1 |
| 5,530,965 | 6/1996 | Kawasaki et al. | 395/800 |
| 5,570,375 | 10/1996 | Tsai et al. | 371/22.3 |
| 5,590,354 | 12/1996 | Klapproth et al. | 395/800 |
| 5,594,876 | * 1/1997 | Getzlaff et al. | 710/113 |
| 5,596,734 | 1/1997 | Ferra | 395/825 |

(List continued on next page.)

FOREIGN PATENT DOCUMENTS

| | | | |
|---|---|---|---|
| 0165600B1 | 11/1991 | (EP) | G06F/13/36 |
| 0636976A1 | 2/1995 | (EP) | G06F/11/00 |
| 0636976B1 | 2/1995 | (EP) | G06F/11/00 |
| 0652516A1 | 5/1995 | (EP) | G06F/11/00 |
| 0702239A2 | 3/1996 | (EP) | G01R/31/3173 |
| 0720092A1 | 7/1996 | (EP) | G06F/11/00 |
| 0933926A1 | 8/1999 | (EP) | H04N/5/00 |
| 0945805A1 | 9/1999 | (EP) | G06F/12/08 |
| 0959411A1 | 11/1999 | (EP) | G06F/13/24 |
| PCT/JP96/02819 | 9/1996 | (JP) | G06F/9/46 |
| 8320796A | 12/1996 | (JP) | G06F/9/46 |
| 8329687A | 12/1996 | (JP) | G11C/15/00 |
| 9212358A | 8/1997 | (JP) | G06F/9/38 |
| 9311786A | 12/1997 | (JP) | G06F/9/38 |
| 10106269A | 4/1998 | (JP) | G06F/12/08 |
| 10124484A | 5/1998 | (JP) | G06F/17/10 |
| 10177520A | 6/1998 | (JP) | G06F/12/10 |

OTHER PUBLICATIONS

Richard York; Real Time Debug for System–on–Chip Devices; Jun. 1999; pp. 1–6.

*Primary Examiner*—Ario Etienne
(74) *Attorney, Agent, or Firm*—Theodore E. Galanthay; Lisa K. Jorgenson; William A. Munck

(57) ABSTRACT

A circuit for use in a system comprising a plurality of modules connected to an interconnect, said modules being arranged to put information onto said interconnect, said circuit comprising circuitry for determining if information on the interconnect satisfies one or more conditions; and circuitry for storing at least part of the information which satisfies the one or more conditions.

18 Claims, 9 Drawing Sheets

U.S. PATENT DOCUMENTS

| | | | |
|---|---|---|---|
| 5,598,551 | 1/1997 | Barajas et al. | 395/484 |
| 5,608,881 | 3/1997 | Masumura et al. | 395/306 |
| 5,613,153 | 3/1997 | Arimilli et al. | 395/821 |
| 5,627,842 | 5/1997 | Brown et al. | 371/22.3 |
| 5,657,273 | 8/1997 | Ayukawa et al. | 395/189.01 |
| 5,682,545 | 10/1997 | Kawasaki et al. | 395/800 |
| 5,704,034 | 12/1997 | Circello | 395/183.14 |
| 5,708,773 | 1/1998 | Jeppesen, III et al. | 395/183.06 |
| 5,724,549 | 3/1998 | Selgas et al. | 395/468 |
| 5,732,094 * | 3/1998 | Petersen et al. | 714/805 |
| 5,737,516 | 4/1998 | Circello et al. | 395/183.14 |
| 5,751,621 | 5/1998 | Arakawa | 364/748.07 |
| 5,765,190 * | 6/1998 | Circello et al. | 711/118 |
| 5,768,152 | 6/1998 | Battaline et al. | 364/551.01 |
| 5,771,240 * | 6/1998 | Tobin et al. | . |
| 5,774,701 | 6/1998 | Matsui et al. | 395/556 |
| 5,778,237 | 7/1998 | Yamamoto et al. | 395/750.04 |
| 5,781,558 | 7/1998 | Inglis et al. | 371/21.1 |
| 5,796,978 | 8/1998 | Yoshioka et al. | 395/416 |
| 5,809,027 * | 9/1998 | Kim et al. | 370/451 |
| 5,828,825 | 10/1998 | Eskandari et al. | 395/183.03 |
| 5,832,248 | 11/1998 | Kishi et al. | 395/376 |
| 5,835,963 | 11/1998 | Yoshioka et al. | 711/207 |
| 5,848,247 | 12/1998 | Matsui et al. | 395/284 |
| 5,848,264 * | 12/1998 | Baird et al. | 395/500 |
| 5,850,562 * | 12/1998 | Crump et al. | . |
| 5,860,127 | 1/1999 | Shimazaki et al. | 711/167 |
| 5,862,387 | 1/1999 | Songer et al. | 395/728 |
| 5,867,726 | 2/1999 | Ohsuga et al. | 395/800.32 |
| 5,884,092 | 3/1999 | Kiuchi et al. | 395/800.35 |
| 5,896,550 | 4/1999 | Wehunt et al. | 395/846 |
| 5,918,045 | 6/1999 | Nishii et al. | 395/584 |
| 5,923,673 * | 7/1999 | Henrikson | . |
| 5,930,523 | 7/1999 | Kawasaki et al. | 395/800.32 |
| 5,930,833 | 7/1999 | Yoshioka et al. | 711/210 |
| 5,943,498 * | 8/1999 | Yano et al. | 395/704 |
| 5,944,841 | 8/1999 | Christie | 714/38 |
| 5,950,012 | 9/1999 | Shiell et al. | 395/712 |
| 5,953,538 | 9/1999 | Duncan et al. | 395/842 |
| 5,956,477 | 9/1999 | Ranson et al. | 395/183.06 |
| 5,978,874 | 11/1999 | Singhal et al. | 710/107 |
| 5,978,902 | 11/1999 | Mann | 712/227 |
| 5,978,937 * | 11/1999 | Miyamori et al. | 714/45 |
| 5,983,017 | 11/1999 | Kemp et al. | 395/704 |
| 5,983,379 | 11/1999 | Warren | 714/727 |
| 6,047,353 * | 4/2000 | Vishlitzky et al. | 711/111 |
| 6,145,099 * | 11/2000 | Shindou | 714/37 |

\* cited by examiner

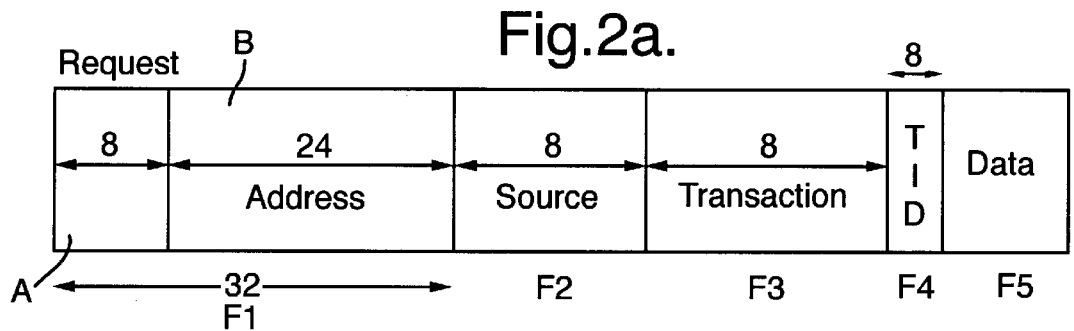
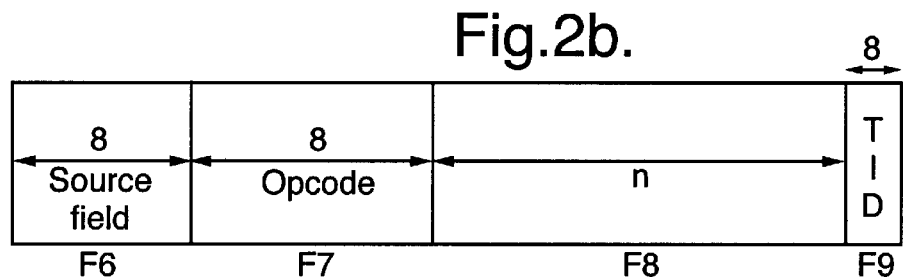
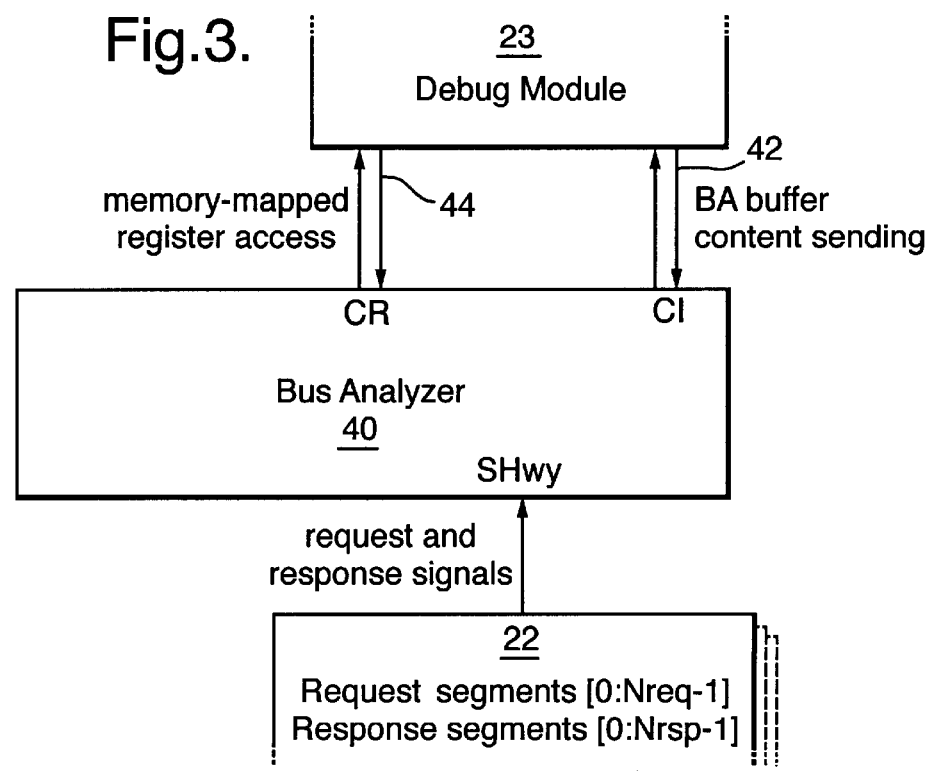

SYSTEM AND METHOD FOR CAPTURING INFORMATION ON AN INTERCONNECT IN AN INTEGRATED CIRCUIT

FIELD OF THE INVENTION

The present invention relates to a circuit for the capturing information on an interconnect. In particular, but not exclusively, the interconnect may be a bus in an integrated circuit.

BACKGROUND TO THE PRESENT INVENTION

Integrated circuits are often provided with debug circuitry which allows the integrated circuit to be debugged. The integrated circuit usually comprises a bus and a plurality of modules connected to the bus which put packets onto the bus. The debug circuitry is one of these modules. The modules also usually include a CPU. In order to operate, the debug circuitry is arranged to receive information from an external tool, put that information onto the bus and to check the response to that information or to output the response to the external tool. The debug circuitry can also carry out internal checks within the integrated circuit.

SUMMARY OF THE INVENTION

It is an aim of embodiments of the present invention to provide a way of capturing information on an interconnect.

According to one aspect of the present invention, there is provided a circuit for use in a system comprising a plurality of modules connected to an interconnect, said modules being arranged to put information onto said interconnect, said circuit comprising circuitry for determining if information on the interconnect satisfies one or more conditions; and circuitry for storing at least part of the information which satisfies the one or more conditions.

According to a second aspect of the present invention, there is provided an integrated circuit comprising an interconnect a plurality of modules connected to an interconnect, said modules being arranged to put information onto said interconnect, said circuit comprising circuitry for determining if information on the interconnect satisfies one or more conditions; and circuitry for storing at least part of the information which satisfies the one or more conditions.

According to a third aspect of the present invention, there is provided a method comprising the steps of monitoring information on an interconnect, the information being put onto the interconnect by one or modules; determining if the information on an interconnect satisfies one or more conditions; and storing at least part of the information satisfying the one or more conditions.

BRIEF DESCRIPTION OF THE DRAWINGS

For a better understanding of the present invention and as to how the same may be carried into effect, reference will now be made by way of example to the accompanying drawings in which:

FIG. 2a and 2b show the structure of request and response packets put onto the bus of FIG. 1;

FIG. 3 shows a block diagram of the relationship of the bus analyser, debug module and bus of FIG. 1;

DETAILED DESCRIPTION OF THE PREFERRED EMBODIMENTS OF THE PRESENT INVENTION

Figure 1:
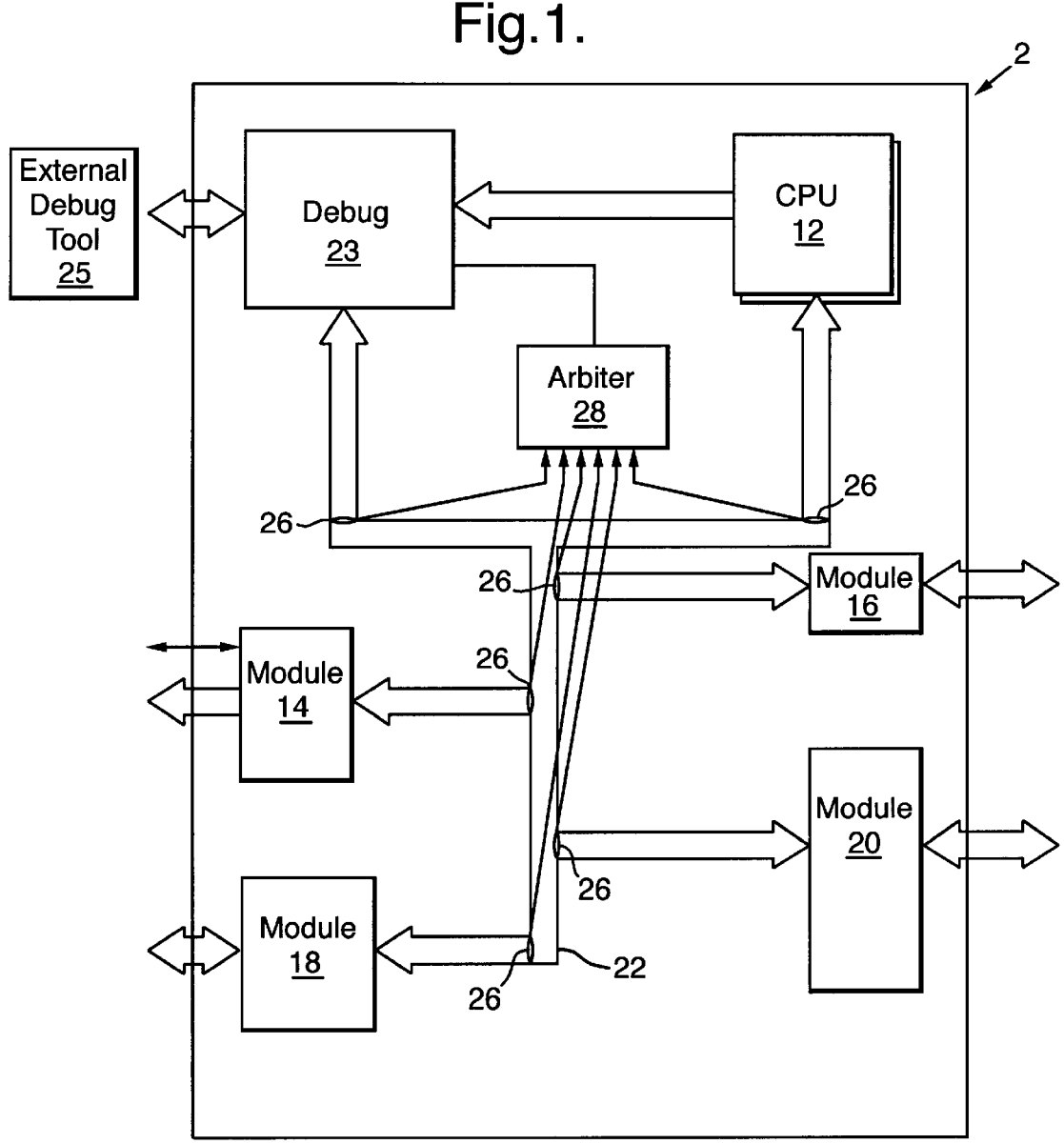
FIG. 1 shows a block diagram of a processor embodied as an integrated circuit connectable to an external memory.

FIG. 1 illustrates an integrated circuit or chip 2 according to an embodiment of the present invention. On the chip 2, one or more CPU modules 12 are provided. The or each CPU module 12 has a plurality of execution units as well as cache memory and memory management units.

The chip 2 also has a number of other modules 14 to 20. These modules 14 to 20 allow communication to occur with elements external to the chip 2. For example, the first module 14 may be an external memory interface which allows the chip 2 to interface within an external SDRAM. A second module 16 also provides an external memory interface with, for example, a flash memory. A third module 18 may take the form of a PCI bus interface which allows an interface between a bus 22 of the chip 2 and an external PCI bus. The fourth module may be a timing module 20 which allows timing signals to be output and/or received from external devices.

It should be appreciated that the modules can take any suitable form and that the four examples described hereinbefore can be replaced by any other suitable modules. The modules which have been described have allowed an interface with an external device, which is not part of the chip 2. One or more of the modules may not be connected to an external device and may therefore provide a function within the chip. More or less than four modules can be provided. One or more modules may be provided externally of the integrated circuit which are able to access the interconnect.

The chip 2 also includes a debug module 23. The debug module 23 is connectable to an external debug tool 25 which assists in the debugging of the chip 2.

The debug module 23, the CPU module 12 and the first to fourth modules 14 to 20 are all connected to the bus 22. Connected between each module and the bus 22 is a respective port 26. These ports 26 act as a gateway between the respective module and the bus 22. The ports 26 are each connected to an arbiter 28. The arbiter 28 receives information from each of the ports 26. This information allows the arbiter 28 to arbitrate between the requests and responses and to allow one or more of these requests and responses to have access to the bus 22 in a given cycle.

The arbiter 28 can use any suitable method of arbitration. The arbitration carried out by the arbiter 28 can take into account the one or more characteristics of the request or response. For example one or more of the following factors can be taken into account:

Is the packet to be put onto the bus a request or a response;

The type of the request and/or the type of response;

The destination of the request or response;

The availability of the destination of to receive the response and/or process the request; and the source of the request or the response.

Alternative embodiments of the invention may use none, some or all of these factors in arbitrating between these requests. Additional factors may be taken into account.

The bus 22 is a split transaction bus which has one or more request buses or bus segments and one or more response buses or segments. All of these buses can carry packets at the same time. There may be different or the same number of request and response segments. However, in alternative embodiments of the present invention, the bus is not a split transaction bus.

The structure of the bus messages will now be described with reference to FIGS. 2a and 2b. FIG. 2a shows the format of a request packet. The request packet has a first field of F1 of 32 bits. The first 8 bits A are used by the bus 22 to identify the destination (usually one of the modules) and thus route the packet. The remaining 24 bits B, which are sometimes referred to as the address, are used by the destination module to identify a location within that module or a function of that module. The second 24 bits B are not used by the bus 22 in order to route the packet.

The request packet also includes an 8 bit source field F2 which identifies the source of the request. In other words, information identifying the module from which the request originates is included. This 8 bit address can take the same format as the 8 bit address A at the head of the packet. This information may be used to route a response back to the source of the request.

The packet also has an 8 bit field F3 which identifies the type of transaction. In other words, this 8 bit field contains the op-code. One of the bits of the op-code field defines the packet as being a request packet or a response packet. For other bit positions in the op-code field F3 of the request packet, the size and type of the transaction are defined. For example, the code might define the transaction as being a read or a write transaction if the request packet is intended for a memory interface module or a similar module.

The request packet also includes a transaction identifier field F4 which is 8 bits wide. This field is used to identify the transaction number. This allows related transactions to be processed in the correct order.

The request packet may also include a data field F5, which contains data for the transaction. Only some types of request packets, such as write packets, will contain data.

The response packet will now be described with reference to FIG. 2b. The response packet does not have the same address field as a request packet but rather has the 8 bit source field from the request packet as its address in its first field F6. This is used to route the response packet back to the module which issued the request. The response packet also has a second 8 bit field F7 which includes an 8 bit opcode. One of the bits of this field will define the transaction as being a response. For responses, only one other bit of the opcode is used and this indicates if the response is a valid response or an error response.

The packet may also include in field F8 n bits of requested data for example in the case of a read request being issued by the requesting module. Not all response packets will include data.

Finally, the request packet also includes a transaction identity field F8 which provides transaction identification information. This information may allow related response packets to be sent consecutively on the bus if required.

It should be appreciated that the request and response packets shown in FIG. 2a and 2b may be replaced by any other suitable packet structure which may have different fields, additional fields or only some of the fields shown in the figures. The order of the fields in the packets shown in FIGS. 2a and 2b may be different in different embodiments of the present invention.

Embodiments of the present invention can be implemented in systems where the requests and responses are not in a packet format. A transaction comprises a request and the response to that request.

The arbiter 28 is arranged to observe the request or response packets issued by each of the modules from the respective ports 26. In one preferred embodiment of the present invention, the arbiter will observe the entire request or response packet. However, in alternative embodiments of the present invention, the arbiter may only observe certain fields of the request and response packets. In some embodiments of the present invention, more than one request and response packet may be presented at a given port at the same time.

In addition to carrying out its normal arbitration functions, the arbiter 28 also provides a bus analysing function in conjunction with elements of the debug module 23. The bus analysing function provides the ability to debug system functions involving bus transactions. A bus transaction comprises a request and its associated response. However, it should be appreciated, that the bus analyser can be used other than in a debug context. For example, the bus analysing function could be used to detect certain events and to generate control signals in response to those events or to provide detection signals which can be used by other elements of the chip or by elements external to the chip.

The bus analysing function provided by embodiments of the present invention allows a transaction or part of transaction (for example a response or a request packet) satisfying one or more criteria to be detected, the capture that transaction if required and the prevention of the module issuing the packet satisfying the criteria from putting any further packets onto the bus, if required.

Reference is now made to FIG. 3 which schematically shows the bus 22, a bus analyser 40 and the debug module 23. The bus analysing function is provided by the bus analyser 40 which is part of the arbiter 28 and the debug module 23. The elements defining the bus analysing function may be alternatively provided in a separate module, totally in the arbiter 28, totally in the debug module 23, or in any other suitable location or locations. In preferred embodiments of the present invention, the bus analysing function is provided by the arbiter 28 and the debug module 23. This is because the registers and the like can be part of the debug module address space. In some embodiments of the invention, it may be complex to give the arbiter an address for the bus analyzer function as this could complicate the arbitration performed.

As can be seen from FIG. 3, the bus analyser 40 receives request and response signals from the bus 22. These signals, in preferred embodiments of the present invention are the signals which have been allowed onto the bus following arbitration and comprise a response or a request packet.

The bus analyser 40 is connected to the debug module 23 by two dedicated connections 42 and 44. In other words, the bus analyser 40 does not use the bus 22 in order to send and receive information from the debug module 23. Each of the two connections 42 and 44 between the bus analyser 40 and the debug module 23 is a two way connection. The information which is transferred via these connections will be described in more detail hereinafter.

Figure 4:
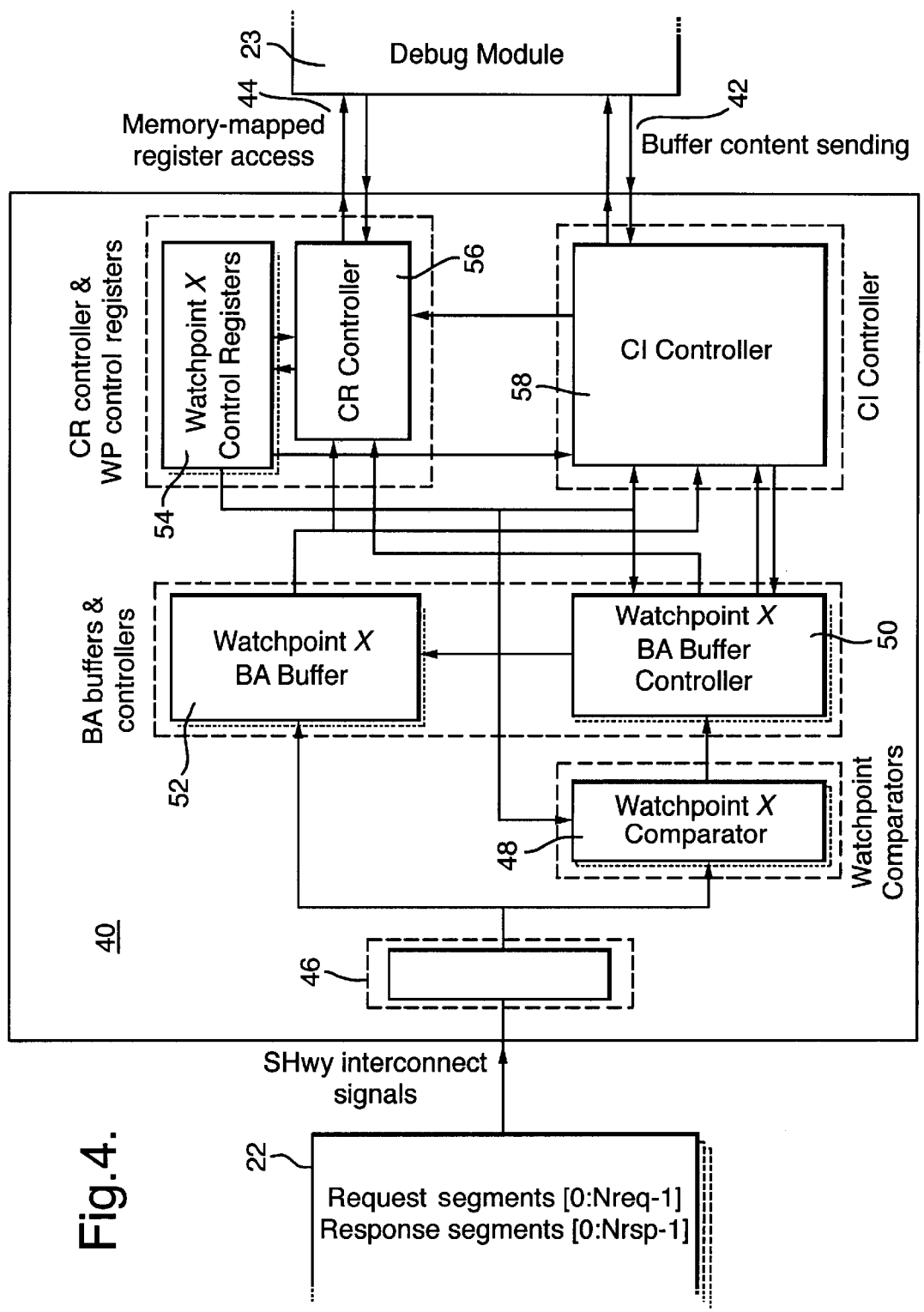
FIG. 4 shows a block diagram of the bus analyser of FIG. 3.

A block diagram of the analyser is shown in FIG. 4. The elements shown in FIG. 4 are provided in order to watch for one condition or watch point. If more than one condition is to be watched for, separate circuitry should be provided for each condition. The circuitry shown in FIG. 4 can look at the response bus and the request bus at the same time. However, if a match or hit is detected both from the response and request bus, only one of the packets is subject to the further bus analysing functions. Where the response or request bus comprises more than one segment, only one segment may be considered at the same time. In alternative embodiments of the invention, the circuitry is able to deal further with both a response packet and a request packet if a hit occurs at the same time. This may require the duplication of at least some of the circuitry. More than one segment of the response and/or request bus may alternatively be considered at the same time.

In alternative embodiments of the present invention which use a split transaction bus, only one of the request part of the bus and the response part of the bus may be looked at by the circuitry at one time. If the request part of the bus and the response part of the bus are to be looked at the same time, there may be at least partial duplication of the circuitry.

The number of watch points which are monitored at the same time as well as the number of bus segments which are monitored at the same time will depend on the space available on the chip. The more watch points and/or bus segments which are monitored at the same time, the more space that is required on the chip 2. It has been found that in practice the monitoring of two watch points and one response segment and one request segment at the same time provides useful results without taking up too much space on the chip. However other numbers of watch points and/or segments may be monitored at the same time.

The bus analyser 40 does not make any distinction between the request part of the bus and the response part of the bus. However, in alternative embodiments of the present invention, the bus analyser may know if a given signal is a request signal or a response signal. This may be from the op-code field in the respective packets or may be provided in a separate manner. If a distinction is made between the different types of packets, these packets may be processed differently.

Figure 5:
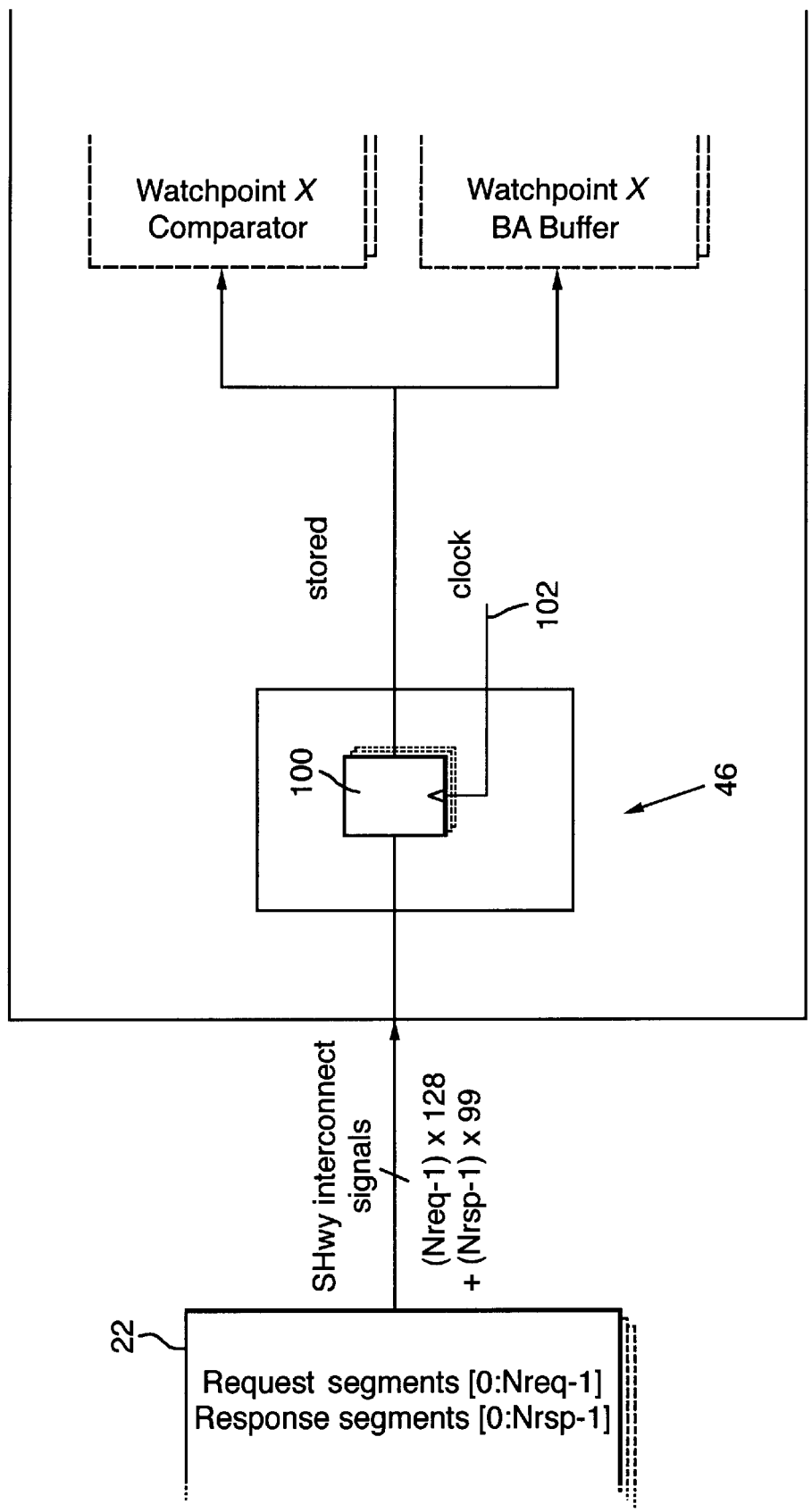
FIG. 5 shows the interface of the bus analyser of FIG. 4 in more detail.

The response and request packets which are on the bus 22 are observed by an interface 46. This interface 46 is shown in more detail in FIG. 5. The input signals from the bus 22 are buffered in a buffer 100. The clocking in of the signals into and out of the buffer 100 is controlled by a clock signal 102. The buffer is provided as it may take some time for the signals from the bus 22 to be received by the interface block 46. In particular, in some embodiments of the present invention, the signals from the bus may only be received shortly before the next rising clock edge. The buffer 100 delays the received response and request packets by one clock cycle. As explained hereinbefore, the signals observed by the interface 46 are those which have been allowed onto the bus. The arbitration function provided by the arbiter 28 will have therefore been previously performed on those signals.

Figure 6:
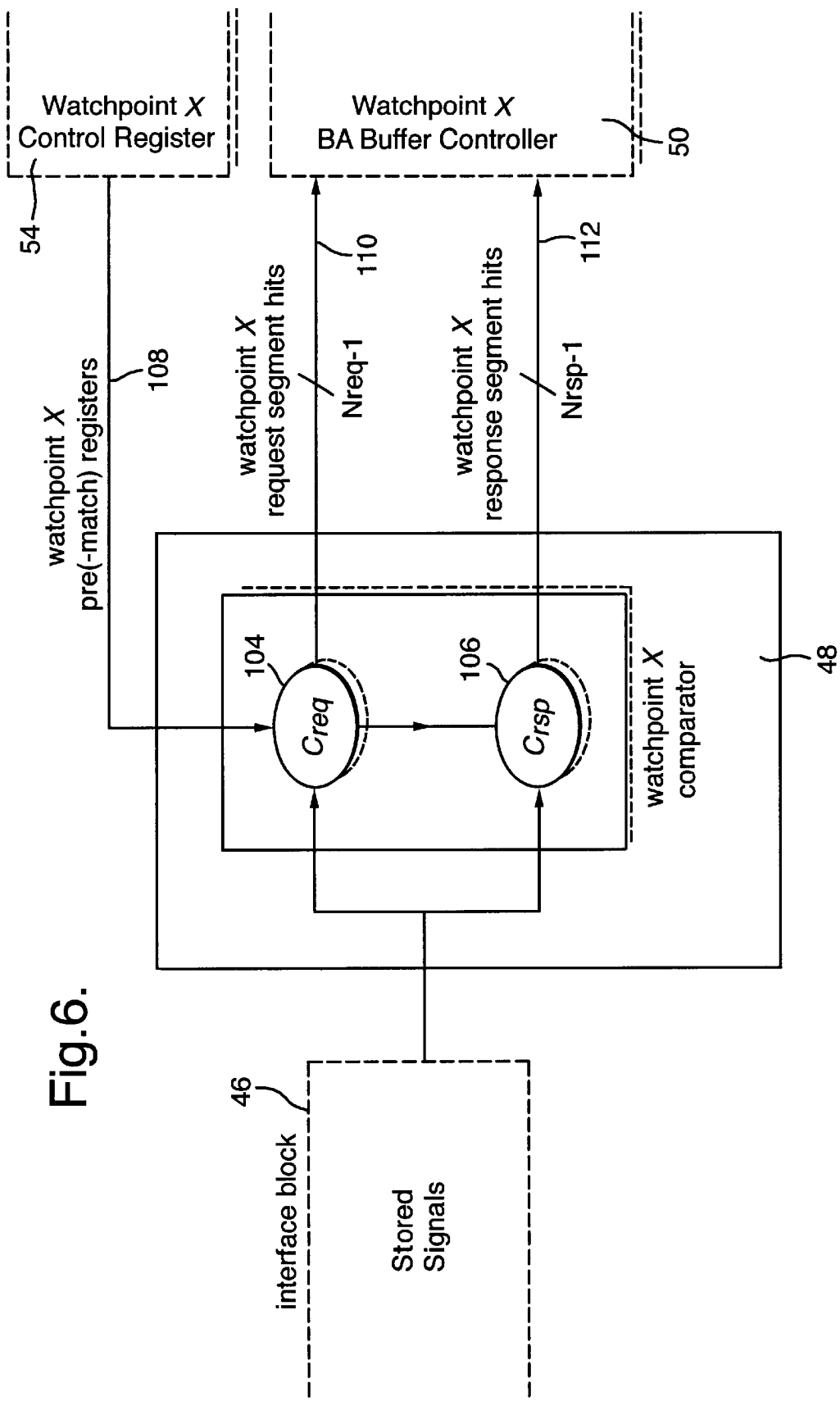
FIG. 6 shows the watch point comparator of FIG. 4 in more detail.

The interface 46 is connected to a watch point comparator 48 and a watch point buffer 52. The watch point comparator will now be described with reference to FIG. 6.

The watch point comparator 48 receives the stored signals from the buffer 100 of the interface 46 from the segments of the bus which are currently being monitored. Accordingly, the signals may relate to a request and a response. The request signals from the interface 46 are input to a first comparator 104 and the response signals are input to a second comparator 106. The first and second comparators 104 and 106 receive information from the watch point control register 54. The watch point control register provides the comparators with match conditions via input 108. Examples of these match conditions will be discussed hereinafter.

The comparators 104 and 106 compare the request and response packets with the match conditions to determine if there is a match or hit.

The output of the first and second comparators 104 and 106 are connected via outputs 110 and 112 respectively to the watch point buffer controller 50 (which is shown in FIG. 4 and which will be discussed in more detail hereinafter). The output provided by the comparators 104 and 106 will indicate whether or not there has been a match or hit. One or both of the comparators can detect a match at the same time. One of the response and request packet is given a higher priority. In the event that a match is detected at the same time, the one of the request and the response having the higher priority is selected and the other of the request and response is discarded.

Figure 7:
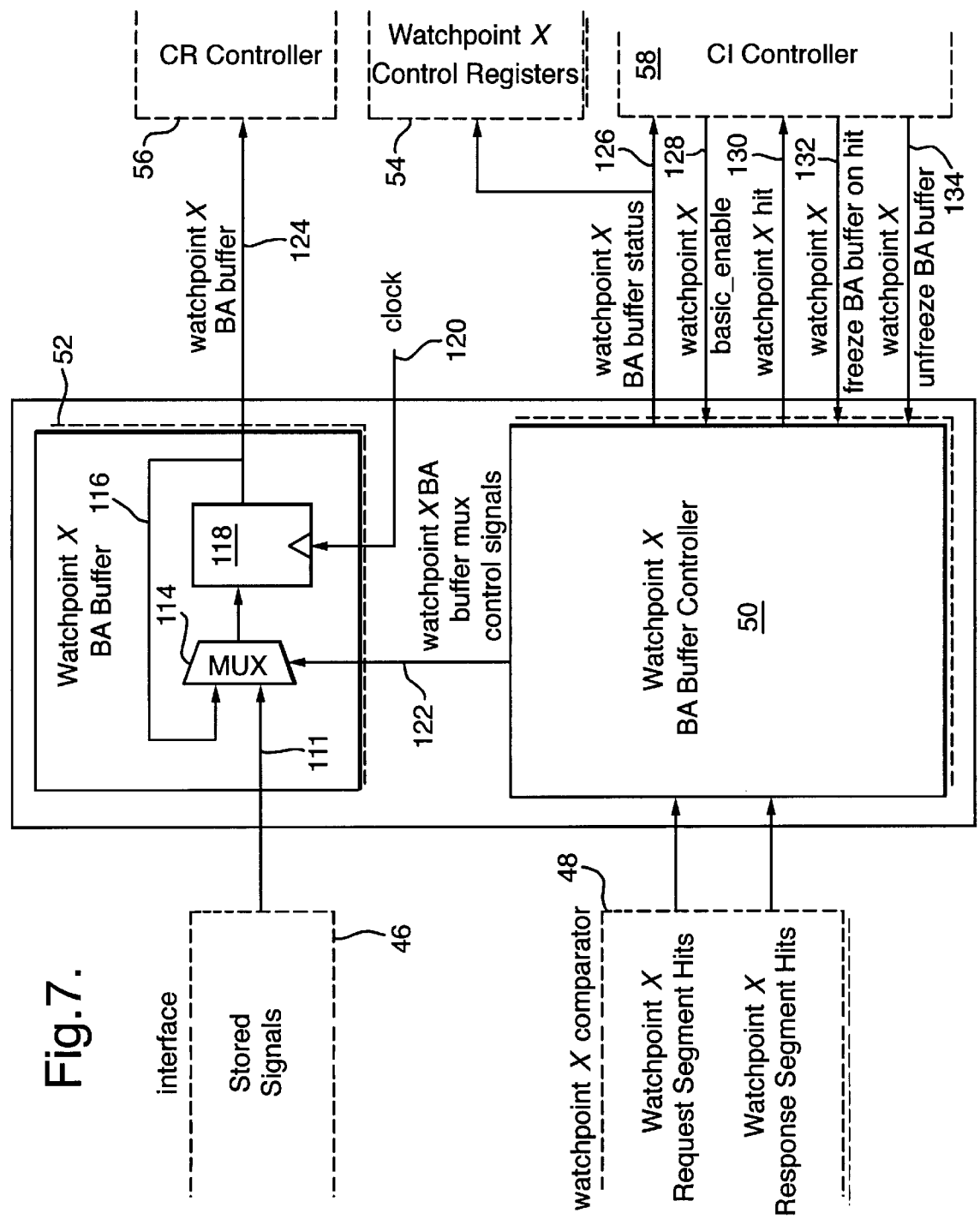
FIG. 7 shows the watch point buffer and watch point buffer controller of FIG. 4 in more detail.

The output 111 of the interface 46 is connected to the watch point buffer 52, as mentioned hereinbefore. The watch point buffer is illustrated in more detail in FIG. 7. The watch point buffer 52 comprises a multiplexer 114 and a buffer 118. The multiplexer 46 receives one input from the interface 46 and a second input from the output of the buffer 118. The buffer 118 is controlled by a clock input 120.

The multiplexer 114 is controlled by a control signal 122 from the watch point buffer controller 50. The watch point buffer controller 50 controls the multiplexer 114 to select one of the first and second input signals 111 and 116. When a hit is detected, the watch point buffer controller 50 provides a control signal which controls the multiplexer 114 to select the input 111 from the interface 46 to provide the response or request packet associated with the hit. This allows the packet or part thereof associated with the hit to be stored in the buffer 118. The buffer 118 is controlled to output the signal received from the interface 46 to a first controller 56 via connection 124.

The connection 124, is, in one embodiment of the present invention, narrower than the width of the buffer 118. Accordingly, the information from the buffer 118 has to be output over more than one cycle. When the buffer 118 outputs the packet at a first clock cycle, the same information is fed back by the second input 116 to the multiplexer 114. Part of the packet is output to the first controller 56 via connection 124. The multiplexer 114 is controlled by the buffer controller 50 to select the second input 116. This allows the same packet to be written again into the buffer 118 so that it is present in the buffer in the next clock cycle. The remainder of the packet can then be received by the first controller 56. The second input 116 is not selected if the last part of the packet is being output to the first controller 56. The buffer 118 is now emptied of the information relating to a given packet.

In alternative embodiments of the present invention, more than two cycles may be required to transfer all of the contents of the buffer to the first controller. Alternatively, the interconnect between the buffer 118 and the controller 56 may be wide enough to transfer the contents of the buffer in one cycle.

The watch point buffer 52 is arranged to capture or store part of a request or response packet when a watch point is detected and the associated action (described in more detail hereinafter) is to capture the transaction. All or only part of the request or response packet causing the hit can be captured. The part of the request or response packet which is captured is referred to as a token. In alternative embodiments, the entire transaction, that is the request and associated response packet, or parts of the request and response part of the transaction may be captured.

In one embodiment of the present invention, the token for requests comprises:

Opcode (8 bits);

Destination (first 8 bits of the address);

Address (21 of the bottom 24 bits of the address);

Source identification (8 bits);

Transaction identification (8 bits);

Mask (8 bits); and

One 64 bit word of data written, if present. If the request had multiple words of data, only the first data word is captured. In alternative embodiments of the present invention, all the words of data may be captured.

The captured token for response packets may comprise:

Opcode (8 bits);

Source of the original request (8 bits);

Transaction identification (8 bits); and

One 64 bit word of data read, if present. If the response has multiple words of data, only the first word is captured.

Not all tokens include data. Examples of this include packets which relate to store responses and load responses.

In alternative embodiments of the invention where only part of a packet is captured, different information may be stored. In alternative embodiments of the invention, the information to be captured may be defined in the action associated with the detection of a hit so that different watch points require different information to be captured.

The watch point buffer 52 is memory mapped. This means that if the action associated with the detection of a hit, the debug module is able to directly read the contents of the watch point buffer. This is described in more detail hereinafter.

The watch point buffer controller 50 is, as described hereinbefore, connected to the watch point comparator 48 and the watch point buffer 52. The watch point buffer controller is also connected to a second controller 58 and the watch point control registers 54. The watch point controller 50 advises the watch point control registers 54 and the first controller 58 of the status of the watch point buffer via connection 126. The buffer 118 can be empty, full or frozen. If the buffer is frozen, the information contained in the buffer is not discarded.

If no hit is detected, the buffer controller 50 disables the multiplexer 114 so that it selects neither the first nor the second inputs 111 or 116 and the received packets are effectively discarded. This is if the buffer has not previously been frozen.

The watch point buffer controller 50 receives an enable signal via connection 128 from the second controller 58. If the enable signal has one value, the buffer controller will enable the watch point buffer if required. If the enable signal has the other value, the buffer controller 50 will not allow the first or second input to the multiplexer 114 to be selected so that nothing can be stored in the buffer 118.

The watch point buffer controller 50 advises the second controller 58 when a watch point has been detected via connection 130. The second controller 58 provides a control signal to the watch point buffer controller 50 via connection 132 to control the freezing of the watch point buffer in response to a watch point being detected. As will be discussed hereinafter, certain watch points when detected have an associated action which requires the buffer 116 to be frozen. The buffer 118 is prevented from receiving any new packets when frozen by the buffer controller 50 controlling the buffer 118. The contents of the buffer 118 are also not discarded.

Finally, via connection 134, the second controller 58 provides a control signal to the watch point buffer controller to control the unfreezing of a previously frozen watch point buffer 52. In practice, this means that the buffer can receive a new packet. The contents of the frozen buffer are effectively discarded. These signals will be discussed in more detail hereinafter. It should be appreciated that the connection between the watch point buffer controller and the second controller 58 can take any suitable format.

Figure 8:
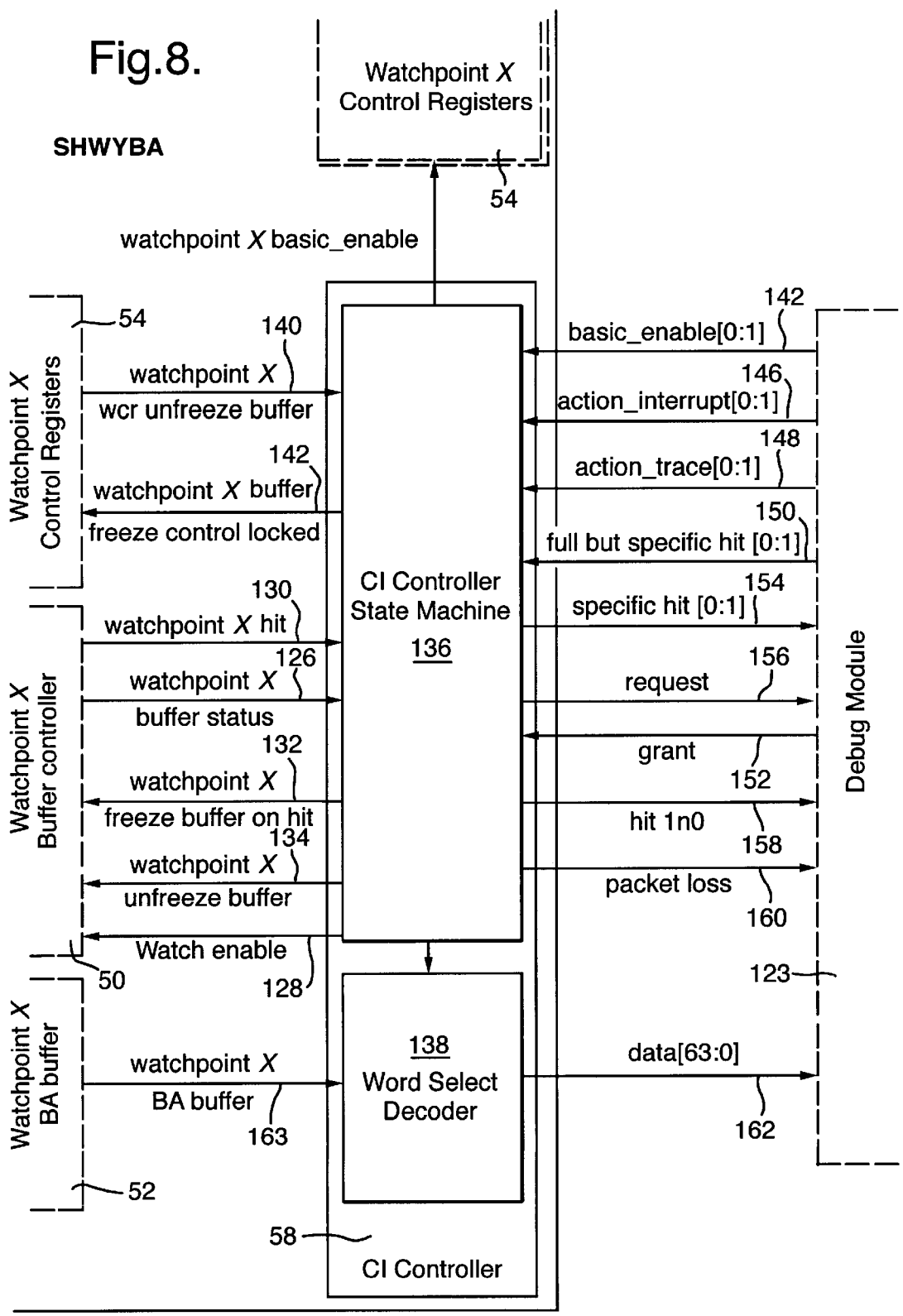
FIG. 8 shows a first controller of FIG. 4 in more detail.

Reference is now made to FIG. 8 which shows the second controller 58 in more detail. The second controller 58 has a state machine 136 which is connected to the watch point buffer controller 50 via the signals described hereinbefore. The second controller 58 also has a word select decoder 138.

The second controller state machine 136 is connected to the watch point control registers 54. The control registers 54 supply the state machine with a watch control register unfreeze buffer signal via line 140. This advises the second controller 58 if the buffer is frozen. The watch point control registers 54 receive from the second controller state machine 136 a signal via line 142 which causes the watch point buffer freeze control to be locked. This signal causes the buffer 52 to be frozen.

The second controller state machine 136 is connected to the debug module 123. In particular, the debug module provides the second controller state machine 136 with the following signals via lines 142 to 152 respectively:

1. Basic enable signal (142)—This enables the bus analyser 40 when high to carry out the described functions. When the signal is low, the bus analyser 40 is disabled.
2. Action interrupt (146)—If an action associated with the detection of a hit or match is "interrupt", the debug module 23 sends this control signal to the bus analyser 40 to allow this function to be performed. The interrupt action is explained in more detail later.
3. Action trace (148)—If an action associated with the detection of a hit or a match is "trace", the debug module 23 sends this control signal to the bus analyser 40 to allow this function to be performed. The trace action is explained in more detail later.
4. Full but specific hit (150)—This signal is sent if a hit has occurred but that the debug module does not have the capacity to deal with this hit. Typically, this will occur if hits occur in successive clock cycles as each hit may take two clock cycles or more to be processed.
5. Grant (152)—This is sent in response to a request signal from the state machine and confirms that the request for access to the debug module 23 can proceed. This request can follow a hit.

The second controller state machine provides the debug module 23 with the following signals via lines 154 to 160 respectively:

1. Specific hit (154)—This is provided when a specific hit occurs. A specific hit is where the precondition and match conditions (described hereinafter) have been satisfied.
2. Request (156)—This is the request referred to with respect to the grant signal on line 152.
3. Hit (158)—This provided when the match conditions have been satisfied, regardless of whether all the preconditions have been satisfied.
4. Packet Loss (160)—this indicates if a packet has been lost. This will occur if there has previously been a hit and the bus analyser 40 is still processing the packet associated with that hit. Until the bus analyser 40 has finished dealing with the packet associated with the hit, the subsequent packets will be lost although it can still be determined if those packets cause a hit.

The word select decoder 138 receives a signal from the output of the watch point buffer 52 via connection 163. The word select decoder 138 decodes the packet signal and provides data contained in the signal to the debug module 23 via connection 162. The word select decoder is required where the width of the interconnect between the bus analyzer and the debug module 23 is less than the size of the buffer. The word select decoder will select which bits are to be transferred from the buffer, written to or read from registers containing the match information. The word select decoder can be omitted if the interconnect between the bus analyzer and the debug module is at least as wide as the buffer and/or the registers.

Figure 9:
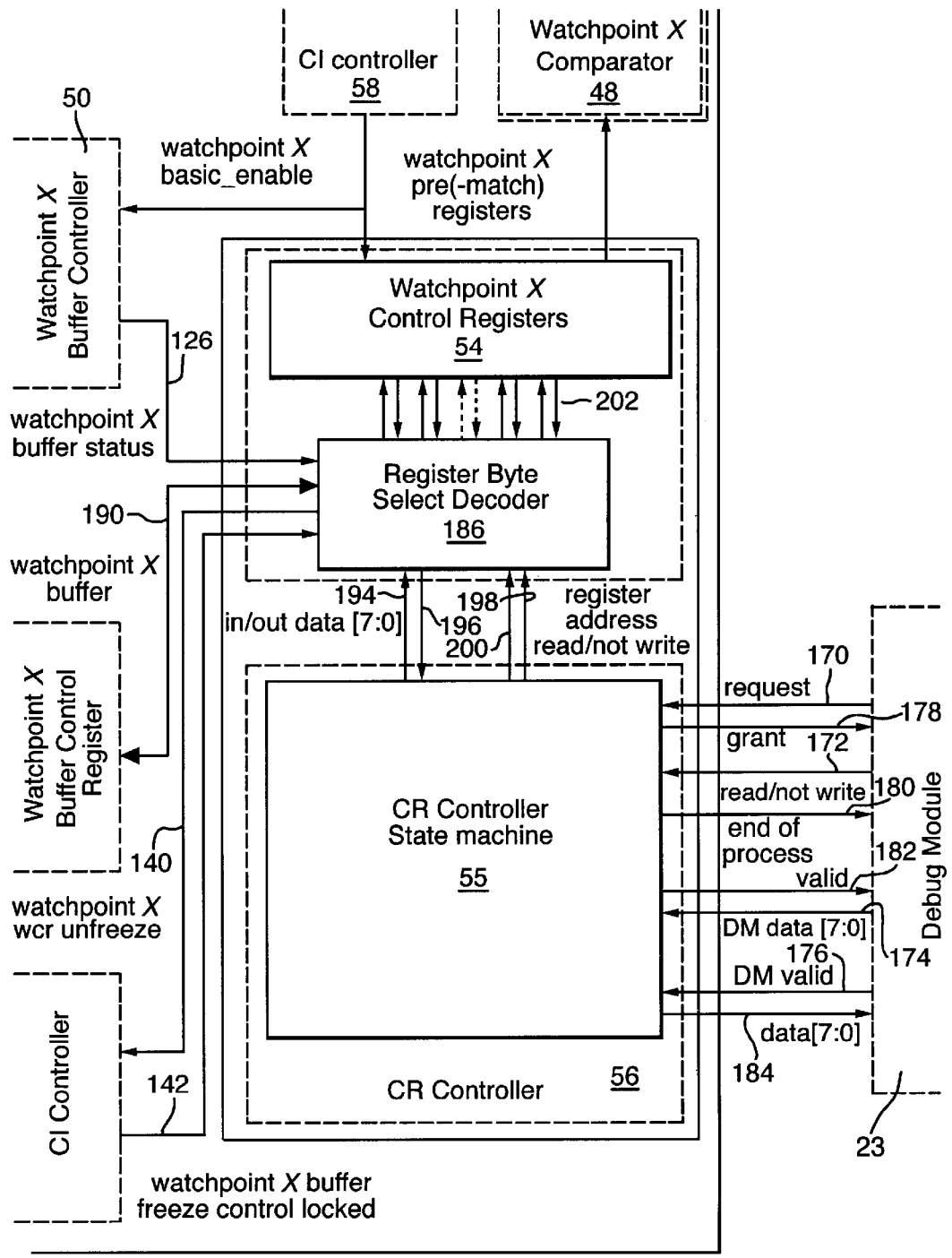
FIG. 9 shows a second controller of FIG. 4 in more detail.

Reference will be made to FIG. 9 which shows the watch point control registers 54 and the first controller 56 in more detail.

The watch point control registers 54 define the match conditions the occurrence of which is being monitored. The conditions can be as follows:

Bus transaction type—opcode values and opcode masks allow any type of response or request packet to be matched.

Source identity identification—that is the identity of the source device of the request or the effective destination for a response. This is also maskable.

Destination device identification—that is the first eight bits of the address and is only applicable to the response packets. This is maskable.

The remaining 24 bits of the address field are also matchable within the start and end of the range defined by this field. In other words, anything in this field is matchable.

It is therefore possible to watch for requests or responses intended for a particular destination or from a particular source, types of message such as in the case of a response packet if it is a normal or an error response, and in the case of a request packet for a particular type of request packet. It is also possible in some embodiments of the present invention to look for requests or responses intended for particular functions or locations within a module. In other words, it is possible to check that all or only some specified bit in a packet match the defined match conditions. In other words, the match conditions may require some or all the bits in a packet to match predefined values.

A summary of the typical timings now follows:
1. detection of a hit—one clock cycle
2. detection of a hit and signalling of the hit to the debug module—two clock cycles
3. detection of a hit and the initiation of the direct transfer—two clock cycles
4. transfer of a captured token—three or four clock cycles.

In preferred embodiments of the present invention, the following information is stored:
preconditions—that is an external precondition, basic enable or chain latch (this is in the debug module 23);
match conditions (this is in the watch point registers 54);
actions—this is the action which has to be performed or occur when a match condition is detected and the preconditions have been satisfied. In other words, the actions define the response to the identification of a given watch point. When it is determined that a match or hit has occurred, the action defined in the register is carried out. (The actions are generally stored in the debug module 23 but the bus analyser will also contain some information relating to the actions.)

The preconditions can include one or more of the following conditions:

Is the bus analyser enabled? If the bus analyser is not enabled then the comparator does not carry out a comparison operation.

Has the event counter reached a given count? For example, a given condition will only provide a full hit if that condition or another condition has occurred a predetermined number of times. A hit may have to occur a predetermined number of times before an associated action will occur.

Has a specific chain latch or latch been enabled in the debug module 23. This is representative of a certain condition has previously occurred or having first occurred. The condition may have occurred anywhere on or off chip.

The match conditions which are stored in the watch point registers 54 can look at one or more of the following conditions at the same time.

Address—this is defined by an address range.

Source—this is defined by a value, values or range of values. A mask can be used.

Packet destination—this is defined by a value and a mask.

Transaction opcode—this is defined by a value and a mask.

The watch point registers 54 have separate destination (the first eight bits of the address field) and address (the last 24 bits of the address field) fields. The first eight bits are matched against a destination value field with a mask if necessary. For example if a specific destination is looked for then all eight bits must have the specified bits. If a number of destinations will satisfy the match requirement then a range of values are specified. In practice, this means that some of the values of the destination field are not important in determining the match and can therefore be masked. The last 24 values of the address can be matched against an address range specified by start and end register fields.

Responses do not contain an address and accordingly when the opcode field in the watch point control register specifies a response, the address and destination field values in the watch point control register are ignored by the use of masking.

As discussed hereinbefore, the response and request packets both contain the source identification. The watch points defined in the watch point register 54 can thus look for a specific source, a subset of sources or any source.

In order for a specific hit to occur, the preconditions and the match conditions must both occur.

The actions can be divided into two different categories, a general category and a specific category.

The following actions fall into the general category and are stored in the debug module 23:

Reset of all performance counters 318 in the debug module 23.

When a given hit or the nth occurrence of the given hit occurs the counters may be reset;

Increment a performance counter 318 in the debug module 23.

This may be done if a given hit has to occur n times before a specific hit occurs;

Decrement an event counter 316 in the debug module 23;

Set/clear a chain latch 314; and

Control the state of the trigger out pin of the chip via circuit 320.

The outputs from the bus analyser are received by a circuit 322 which in response to the received signal determines which general action is required and provides a control signal to one or more of the chain latches 314, the event counters 316, the performance counters 318 and the circuit 320 which has a trigger latch and controls the state of the trigger out pin of the chip.

The following actions fall into the specific category and are stored in the watch point register 54 in the bus analyser 40 or in the debug module:

Freeze the source of a packet on detection of a hit (debug module 23);

Generate a trace message on detection of a hit, using the captured token (watch point register 54);

Capture the token and raise a debug interrupt (watch point register 54).

Figure 10:
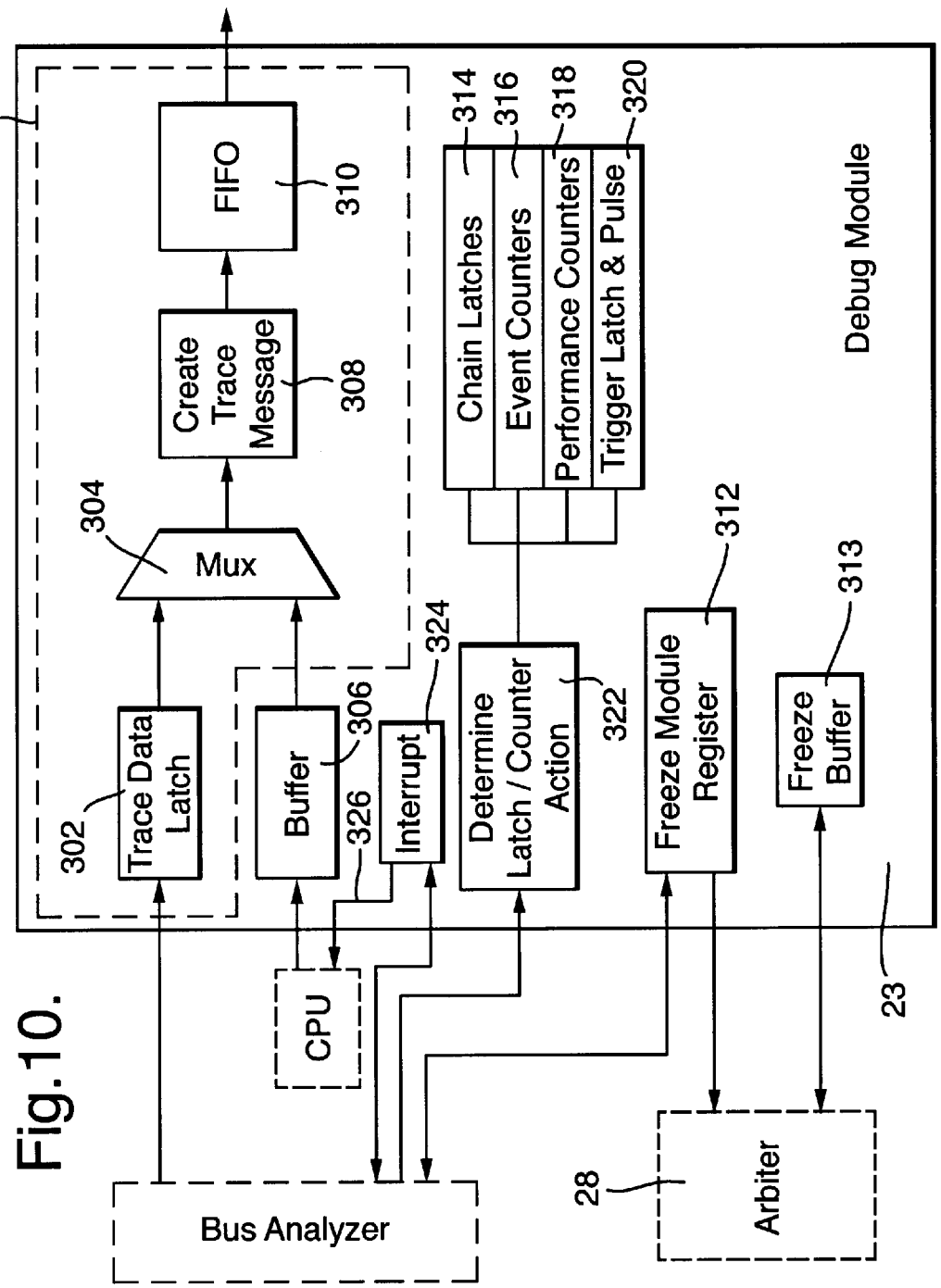
FIG. 10 shows the debug module of FIG. 1 in more detail.

The specific actions will now be described in more detail. One action is the capture of a packet in order to enable a trace message to be generated. The trace message may be forwarded to any module on chip or off chip. For example the trace message can be forwarded to the debug module. If a packet is to be captured, the packet which caused the hit or match is stored in the watch point buffer 52 as described hereinbefore. The packet stored in the watch point buffer 52 is output to the debug module 23. The debug module 23 is shown in FIG. 10. This packet is stored in the debug module 23 in capture buffer circuitry 300 and in particular in a trace data latch 302. The elements of the debug module 23 can be seen in more detail in FIG. 10. The trace data latch is input to a multiplexer 304.

The multiplexer 304 also receives an input from a further buffer 306 which receives a trace bus from a watch point controller of the CPU module 12. The output of this multiplexer 304 is input to a trace message generator 308. This may be provided in conjunction with the freeze action.

In response to the capture of a packet or a part thereof, a trace message can be generated. This trace message may include information on the bus transaction. The trace message can be written to a FIFO 310 or other suitable store in the debug module 23. In alterative embodiments of the present invention, the FIFO or other suitable store may be at any other suitable location on the chip or off the chip. This trace message is then used to assist in the debugging of the chip 2. In preferred embodiments of the present invention, the debug module 23 will determine the destination of the trace messages.

An alternative action which is possible is the generation of a debug interrupt to a specific CPU or CPUs which will invoke a debug handler. The interrupt may be provided to any module on or off chip. In this mode, the capture buffer captures the associated token and this is read by the debug module 23. In this mode, no trace generation is possible. When an interrupt is detected, the cause of the interrupt can be determined. The interrupt circuit 324 of the debug module 23 reads the captured token and uses this information to determine the cause of the interrupt. This contrasts with the trace message capture where the bus analyser 40 outputs the captured token to the debug module. In the interrupt action, the debug module 23 reads the captured token in the capture buffer 52. The token is stored in the buffer until it is no longer required, that is the buffer is frozen. In this mode the debug module 23 will send an interrupt signal 326 to the CPU 12. The interrupt circuit 324 and the interrupt signal 326 are shown in FIG. 10. The debug handler will unfreeze the buffer as required.

Another action which the bus analyser may take is to stop a specific bus initiator (that is one of the modules) from making any further bus requests or responses. In other words, any of the modules which make bus requests or responses can be prevented from making any further bus requests or responses. This is achieved by controlling the arbiter 28 to not allow requests or responses from the module to win access to the bus. This has the effect of freezing the module.

It should be appreciated that in some embodiments of the invention, only some types of module can be frozen. For example in one embodiment of the invention, it is not possible to freeze the CPU module 12. It is also possible to partially freeze a module so that it is prevented from putting requests onto the bus but can put responses onto the bus or vice versa.

As described hereinbefore, the capture buffers can also be frozen if a hit is detected and the action is to freeze.

The freezing action of the module may also occur when the watch point which is detected causes a debug interrupt in the debug module 23. This can occur at anytime by software by writing to a freeze register.

The freeze action allows the debug module 23 to read any number of registers or memory locations after a watch point hit has been detected, without the possibility that the values are changed by the now frozen module.

A field is defined which has a number of bits sufficient to allocate a different value to each different module. For example if the field has 4 bits, up to 16 modules can be provided. In preferred embodiments of the invention, there may be no correlation between the module number defined by this field and its assigned 8 bit address (at the beginning of the address field) used to route the packets on the bus. In preferred embodiments of the invention, the relationship between the address used to route the packets is the module number implementation specific and is know by the person who sets up the watch points.

The status of each module, that is whether it is frozen or not is stored in the freeze register 312 in the debug module. If a '1' value is stored as the bit of the register for a given module, then that module is frozen. Likewise if a '0' value is stored in the register, then the module associated with that bit is not frozen. The '1' value can of course represent a non frozen state and a '0' value a frozen state in alternative embodiments of the present invention. The arbiter 28 will read the values in this register and will only allow requests or responses from modules which are not frozen to win access to the bus.

When a watch point action is freeze and there has been a hit, the bit of the register associated with the module which caused the hit is updated to the freeze value. The debug module 23 or any other module such as the CPU or even the external tool connected to the debug module is able to read this register. Additionally, the debug module 23 can unfreeze a module simply by writing the unfrozen value into the bit of the register associated with the module. The debug module can also cause a module to be frozen by writing the freeze value into the bit of the register associated with that module. This may be independent of the bus analyser 40. It should be appreciated that in some embodiments of the invention, the freeze buffer can be written to in order to change the status of a module. In other words a module can be frozen or unfrozen simply. This mechanism can be used independently of the bus analyzer, in some embodiments of the present invention.

The register can be accessed by any suitable module on or off chip in a nonintrusive manner.

A similar freeze register 313 is provided for the buffer 52 to control whether or not it is frozen. To unfreeze buffer 52 the unfreeze value is written into the register. Likewise to freeze the buffer 52, the freeze value is written into the registers.

The precondition and general action registers are in the debug module along with the freeze bus master action. The bus analyser 40 knows about the basic enable flags generated by the debug module 23, contains the specific match registers and knows about some of the actions such as interrupt and trace.

In alternative embodiments of the present invention, the analyser may use the 8 bit source address as the module identity.

In alternative embodiments of the invention, one or more modules other than the source of the packet causing the freezing action may be also frozen or may be frozen instead of the source of the packet causing the freezing action. In the case of response packets, the source of the response packet and/or the source of the request packet in response to which the response packet has been generated may be frozen.

In alternative embodiments of the present invention, more than one action may be associated with a given watch point. In preferred embodiments of the present invention, only one action is associated with a given watch point.

Those values which are maskable may be omitted in the comparison carried out by the comparator for certain types of packet. If more than one watch point is to monitored at the same time, a watch point comparator will be provided for each watch point. This may require duplication of some circuitry, although in preferred embodiments of the invention, sharing of some or all circuitry may be possible. The watch point comparators 104 and 106 may look for the same or different watch points.

The first controller 56 has a first controller state machine 55. The first controller state machine 55 is connected to the debug module 23. The first controller state machine 55 (see FIG. 9) receives the following signals from the debug module 23 via lines 170 to 176 respectively:

1. Request (170)—This for requests from the debug module 23.
2. read/not write (172)—This signal indicates if the contents of the watch point registers 54 are to be read or written to.
3. Debug module data (174)—This is for data from the debug module being written to control registers or being read from control registers. This data allows the values in the watch point registers 54 to be changed or allows the operation of the first state machine to be changed if required.
4. Debug module valid (176)—This enables the three above signals.

The first controller state machine 55 sends the following signals to the debug module 23 via connections 178 to 184 respectively:

1. Grant (178)—This is issued in response to the request received from the debug module.
2. End of process (180)—This indicates that the watch point registers have been updated.
3. Valid (182)—This signal enables the signals from the first controller state machine.
4. Data (184)—This allows the bus analyser to provide the debug module with information received from a register byte select decoder 186.

The first controller state machine 55 is also connected to a register byte select decoder 186. The register byte select decoder 186 is connected to the watch point control registers 54. The register byte select decoder 186 selects either the watch point control registers containing the match conditions or the watch point buffer control registers. The decoder also receives the watch point buffer freeze control signal on line 142, as discussed previously. The second controller 58 receives the watch point controller unfreeze signal via line 140 from the register byte select decoder 186, as discussed previously. The register byte decoder is connected to the watch point buffer via connection 190 and associated control registers from which the contents of the buffer can be accessed.

The register byte select decoder 186 is connected to the first controller state machine 55 via connections 194 and 196. These connections allow data to be written into the register 54 and data to be read out of the registers 54 respectively. The register byte select decoder 186 receives a register address signal from the first controller state machine via line 198 which identifies an address in the register for the data to be written to or for data to be read from. The read not write signal via line 200 indicates if a read or a write operation is to take place.

The register byte select decoder 186 is connected to the registers by a series of inputs and outputs 202. These inputs and outputs allow data to be written to or read from the registers 54.

The operation of the bus analyser can be summarised as follows:

packets from the observed part of the bus which have won the arbitration are input to the watch point comparators 48;

the packets are compared with the required match conditions stored in the watch point registers 54, assuming that the preconditions are satisfied;

if there is no match the packet is discarded;

if there is a match, the action defined in the watch point registers 54 will be performed.

If the action is a capture function, then the token(s) causing the hit is captured or stored by the capture buffer. Depending on whether an interrupt or a trace is to be performed, the token in the buffer is read out to the debug module or is read by the debug module.

If the action is to freeze the source module, the freeze register is updated and the frozen module is unable to win access to the bus 22.

The bus analyser 40 can be used in conjunction with performance counters in the debug module to capture selected performance parameters to allow the system software, for example contained in the debug module to tune the parameters of individual application specific modules or bus arbiters. For example the number of requests, responses, specific accesses to specific modules or addresses, errors, cache hits or other performance indicators can be determined.

In preferred embodiments of the present invention, the comparators 48 and the watch point buffer 52 are provided close to the bus, for example with the arbiter. The control registers 54 and action logic may be located in the debug module. However in alternative embodiments of the present invention, the elements of the bus analyser may be provided at any suitable location, together or separately. In one preferred embodiment of the present invention, the bus analyser has part of the address space allocated to the debug module even where the bus analyser is not all provided within the debug module. This means that the arbiter does not itself require address space. There is however in alternative embodiments of the present invention, the bus analyser may have its own address space or may share address space with any other suitable component or module.

In the preferred embodiment of the present invention, the bus analyser observes the requests and responses after arbitration has taken place. It should be appreciated that in preferred embodiments of the present invention the comparison made by the watch point comparators does not delay the normal function of the arbiter. In alternative embodiments of the present invention, the bus analyser can observe the requests and responses prior to arbitration.

In the preferred embodiment of the present invention, the bus analyser observes requests and responses on a bus. In alternative embodiments of the present invention, signals on any other suitable type of interconnect may be monitored. In some embodiments of the present invention, the debug module 23 is unaware of the nature of the bus.

What is claimed is:

1. A bus analyzer for use in a system comprising a plurality of modules connected to a bus, said plurality of modules being arranged to put information onto said bus, said bus analyzer comprising:
a detector for determining a first module that has won arbitration of said bus against a second module and identifying a data packet portion associated with said first module; and
a comparator for determining whether a data field in said data packet portion matches at least one of a plurality of predetermined parameters wherein said bus analyzer, in response to a determination that said data field matches at least one of said predetermined parameters, one of:
generates a trace message to be read by a debug module; and
generates an interrupt for transmission to said debug module.

2. The bus analyzer as set forth in claim 1, further comprising a circuit for performing at least one action when said packet matches said at least one of a plurality of predetermined parameters.

3. The bus analyzer as set forth in claim 2, wherein said action comprises preventing at least one module from accessing said bus.

4. The bus analyzer as set forth in claim 1, wherein said bus analyzer is capable of performing an action comprising one of:
freezing the source of said packet;
generating a trace message; and
generating a debug interrupt.

5. The bus analyzer as set forth in claim 1, wherein said predetermined parameters comprise at least one of the following:
bus transaction type;
source identity identification; and
destination device identification.

6. The bus analyzer as set forth in claim 1 wherein said bus analyzer comprises a portion of an arbiter module connected to said bus.

7. The bus analyzer as set forth in claim 1, wherein one of said modules comprises a debug module.

8. An integrated circuit, comprising:
a plurality of modules;
an bus connecting said plurality of modules; and
a bus analyzer connected to said bus, comprising:
a detector for determining a first module that has won arbitration of said bus against a second module and identifying a data packet portion associated with said first module; and
a comparator for determining whether a data field in said data packet portion matches at least one of a plurality of predetermined parameters wherein said bus analyzer, in response to a determination that said data field matches at least one of said predetermined parameters, one of:
generates a trace message to be read by a debug module; and
generates an interrupt for transmission to said debug module.

9. The integrated circuit as set forth in claim 8, further comprising a circuit for performing at least one of a plurality of actions when said packet matches said at least one of a plurality of predetermined parameters.

10. The integrated circuit as set forth in claim 8, wherein one of said actions comprises preventing at least one module from accessing said bus.

11. The integrated circuit as set forth in claim 8, wherein said integrated circuit is capable of performing an action comprising one of:
freezing the source of said packet;
generating a trace message; and
generating a debug interrupt.

12. The integrated circuit as set forth in claim 8, wherein said predetermined parameters comprise at least one of the following:
bus transaction type;
source identity identification; and
destination device identification.

13. The integrated circuit as set forth in claim 8 wherein said bus analyzer comprises a portion of an arbiter module connected to said bus.

14. The integrated circuit as set forth in claim 8, wherein one of said modules comprises a debug module.

15. A method for capturing information on a bus in an integrated circuit comprising the steps of:
determining a first module that has won arbitration of said bus against a second module and identifying a data packet portion associated with said first module; and
determining whether a data field in said data packet portion matches at least one of a plurality of predetermined parameters wherein said bus analyzer, in response to a determination that said data field matches at least one of said predetermined parameters, one of:
generates a trace message to be read by a debug module; and
generates an interrupt for transmission to said debug module.

16. The method as set forth in claim 15 further comprising
performing at least one action when said packet matches said at least one of a plurality of predetermined parameters.

17. The method as set forth in claim 16, further comprising the step of preventing at least one module from accessing said bus.

18. The method as set forth in claim 15, further comprising:
determining the bus transaction type;
identifying a source; and
identifying a destination device.

* * * * *